Patented Jan. 22, 1935

1,988,861

UNITED STATES PATENT OFFICE 1,988,861

PRODUCTION OF METALLIC PLATES SUITABLE FOR USE AS ACCUMULATOR ELECTRODES

Ernst Thorausch, Mannheim, and Leo Schlecht, Ludwigshafen-on-the-Rhine, Germany, assignors to I. G. Farbenindustrie Aktiengesellschaft, Frankfort-on-the-Main, Germany No Drawing. Application February 18, 1930, Serial No. 429,456. In Germany February 23, 1929

3 Claims. (Cl. 136—29)

The present invention relates to the production of metallic plates suitable for use as electrodes for accumulators.

It has already been proposed to employ porous metal plates as electrodes for accumulators, for example porous iron and nickel plates as the electrodes for accumulators having alkaline electrolytes.

We have now found that for this purpose particularly suitable plates are obtained by subjecting metal powder, in admixture with additional materials capable of being removed from the mass, to sintering by a pressure and/or heat treatment, the additional materials being partially or wholly removed from the mass obtained, for example by dissolving out or by volatilization. It is preferable to employ such metal powders which have been prepared from the corresponding metal carbonyls.

According to this manner of working, especially when a high compression pressure or a high sintering temperature is employed, a highly porous metal frame is obtained, the walls of the pores of which are very stable and unaffected by shaking. A further advantage of this manner of working resides in the fact that useful electrodes for accumulators may be prepared even from very loose finely grained metal powders having a low weight by volume from which, without additional materials, only slightly porous pieces of metal would be obtained which are unsuitable for accumulator purposes.

Suitable additional materials for the purposes of the present invention are compounds which are soluble in solvents which do not attack or destroy the metallic structure as for example sodium chloride, potassium chloride, sodium sulphate, magnesium chloride or other inert water-soluble salts, and also materials which volatilize when heated, such as ferric chloride, aluminium chloride, mercuric chloride and ammonium salts, in particular ammonium bicarbonate or ammonium chloride, or organic substances, for example oxalic acid, ammonium oxalate, urea and naphthalene. Generally speaking with substances which volatilize only at comparatively high temperatures and then only slowly, more stable and more porous pieces of metal are obtained since the particles of metal sinter together while the additional material is still present in the moulded article. By maintaining a low sintering temperature at the first or by corresponding regulation of the vapour or decomposition tension of the additional material by maintaining a suitable pressure over the mass to be sintered, for example by carrying out sintering in an ammonia atmosphere in case the additional substance is an ammonium salt, the volatilization of the additional materials may be delayed until a satisfactory sintering together of the metal particles has taken place.

The removal of the additional materials from the mass may be effected not only by dissolving or volatilizing, but may also be carried out by treatment with another substance which forms a volatile compound with the additional materials. Thus for example carbon may be removed from a slab of sintered nickel by an oxidizing treatment for example with air, steam or carbon dioxide. In cases when the small amount of nickel oxide which is thus formed within the individual pores is undesirable, a subsequent reduction is carried out for example in a stream of hydrogen or by electrolytic means.

Soluble compounds and volatilizable substances may be added simultaneously to the metal powder or metal powder mixture.

In many cases it is preferable subsequently to sinter the highly porous shaped articles obtained at elevated temperatures as for example at 1000° centigrade.

The amount of the additional material used according to the present invention should be at least 5 per cent by weight of the metallic powder, and preferably much more, for example from 30 to 40 per cent.

It is surprising that even with such large amounts of additional materials the metallic powders, and especially those obtained from the corresponding metal carbonyls, are still capable of sintering to strong, coherent plates of high porosity.

The new electrodes have the great advantage that their porosity is much higher than in the case of the porous electrodes hitherto known. Usually the volume of the pores is at least 70 per cent of the volume of the plates. Moreover the electrodes can be prepared with almost any desired volume and width of the pores, so that they can be adapted to almost any particular requirements of practice.

It is possible according to the present invention to incorporate with the metallic powders also substances which are not subsequently to be removed from the mass, such as iron oxide or activating additions such as mercury oxide, and these increase the capacity of the electrodes.

The following examples will further illustrate the nature of this invention, but the invention is not restricted thereto. The parts are by weight.

Example 1

70 parts of a nickel powder having a weight by volume of 300 grams per 100 cubic centimetres and obtained by thermal decomposition of nickel carbonyl are intimately mixed with 30 parts of powdered ammonium bicarbonate and the whole is heated in the form of a slab, firstly for 4 hours at 600° centigrade and then for an hour at 800° centigrade, in a stream of hydrogen. In this manner a porous plate having a pore volume of 84 per cent is obtained which being impregnated with a solution of nickel nitrate and being inserted into an alkaline accumulator as the anode shews a capacity about 20 per cent greater than the Edison anodes having a tubular structure hitherto employed.

Example 2

50 parts of iron powder obtained by the thermal decomposition of iron carbonyl are mixed with 50 parts of ground sodium chloride. The mixture is filled into forms suitable for making it into plates and heated to 780° C. in a current of hydrogen. After cooling, the resulting plate is leached with water, whereby a porous iron plate, the pores of which have a volume of 80 per cent of the volume of the plate, is obtained.

Example 3

100 parts of an electrolytically prepared iron powder are mixed with 10 parts of finely powdered carbon and heated for 10 hours to 650° C. and then for 2 hours to 800° C. in a current of nitrogen free from oxygen. Thereupon air is added to the nitrogen and the heating continued for 3 to 4 hours, whereby the carbon is burnt. Simultaneously the sintered iron is partly oxidized; it is then reduced in a rapid current of hydrogen at 800° C. The volume of the pores in the resulting mass is 72 per cent of the volume of the mass.

What we claim is:—

1. The process of producing porous metal plates suitable for use as electrodes, which comprises mixing a metallic powder obtained from the corresponding metal carbonyl with at least 5 per cent its weight of an additional material capable of being removed from the mass, subjecting the uncompressed mixture to sintering by heat and removing at least part of the additional material.

2. The process of producing porous metal plates suitable for use as electrodes, which comprises mixing a metallic powder obtained from the corresponding metal carbonyl with at least 5 per cent its weight of a volatilizable additional material and subjecting the uncompressed mixture to sintering by heat.

3. The process of producing porous metal plates suitable for use as electrodes, which comprises mixing a metallic powder obtained from the corresponding metal carbonyl with at least 5 per cent its weight of ammonium bicarbonate and subjecting the uncompressed mixture to sintering by heat.

ERNST THORAUSCH.
LEO SCHLECHT.